(12) United States Patent
Hwang et al.

(10) Patent No.: US 11,364,949 B2
(45) Date of Patent: Jun. 21, 2022

(54) STEERING-ANGLE-LIMITING DEVICE OF STEER-BY-WIRE SYSTEM

(71) Applicants: HYUNDAI MOTOR COMPANY, Seoul (KR); KIA MOTORS CORPORATION, Seoul (KR)

(72) Inventors: Sang Woo Hwang, Seoul (KR); Young Dae Park, Asan-si (KR); Byung Rim Lee, Seongnam-si (KR); Min Jun Kim, Busan (KR); Se Hyun Chang, Suwon-si (KR); Hyeon Seok Cho, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 16/255,565

(22) Filed: Jan. 23, 2019

(65) Prior Publication Data
US 2020/0130733 A1 Apr. 30, 2020

(30) Foreign Application Priority Data
Oct. 25, 2018 (KR) .......................... 10-2018-0128183

(51) Int. Cl.
| | |
|---|---|
| *B62D 5/04* | (2006.01) |
| *B62D 5/00* | (2006.01) |
| *F16H 25/16* | (2006.01) |
| *B62D 3/02* | (2006.01) |
| *F16H 61/12* | (2010.01) |

(52) U.S. Cl.
CPC ........... *B62D 5/0484* (2013.01); *B62D 5/001* (2013.01); *F16H 25/16* (2013.01)

(58) Field of Classification Search
None
See application file for complete search history.

(56) References Cited

U.S. PATENT DOCUMENTS

| | | | |
|---|---|---|---|
| 11,161,541 B2* | 11/2021 | Hwang | .................. B62D 6/008 |
| 2005/0000749 A1* | 1/2005 | Sato | ...................... F16D 41/086 |
| | | | 180/402 |
| 2011/0127104 A1* | 6/2011 | Shibahata | .............. B62D 5/001 |
| | | | 180/446 |

(Continued)

FOREIGN PATENT DOCUMENTS

| | | |
|---|---|---|
| KR | 10-0421423 B1 | 3/2004 |
| KR | 10-2019-0143575 A | 12/2019 |

*Primary Examiner* — Aniss Chad
*Assistant Examiner* — Mahmoud M Kazimi
(74) *Attorney, Agent, or Firm* — Lempia Summerfield Katz LLC

(57) ABSTRACT

A steering-angle-limiting device of a steer-by-wire system selectively restricts turning of a steering wheel in a forward direction or in a reverse direction and permits turning of the steering wheel in order to inhibit locking of the steering wheel when the steering-angle-limiting device operates abnormally. Rotation of a stopping gear, which is coupled to a steering shaft, is selectively restricted depending on a change in a rotation angle of a cam, whereby the direction in which the steering wheel turns is selectively limited. In addition, when a stopper operates abnormally, the stopper is moved to a position apart from an end of the radius of rotation of the stopping gear, thereby enabling turning of the steering wheel.

5 Claims, 13 Drawing Sheets

(56) References Cited

U.S. PATENT DOCUMENTS

| | | | |
|---|---|---|---|
| 2013/0161116 A1* | 6/2013 | Tashiro | B62D 5/005 180/446 |
| 2013/0161118 A1* | 6/2013 | Yoshimoto | B62D 5/001 180/446 |
| 2014/0007726 A1* | 1/2014 | Muraki | G05G 1/10 74/473.3 |
| 2016/0009311 A1* | 1/2016 | Khale | B62D 1/286 74/530 |
| 2018/0141585 A1* | 5/2018 | Kim | B62D 5/0466 |
| 2019/0291776 A1* | 9/2019 | Shin | B62D 5/0463 |
| 2020/0198689 A1* | 6/2020 | Ashida | B62D 5/001 |

* cited by examiner

STEERING-ANGLE-LIMITING DEVICE OF STEER-BY-WIRE SYSTEM

CROSS-REFERENCE TO RELATED APPLICATION

This application claims priority to and the benefit of Korean Patent Application No. 10-2018-0128183, filed on Oct. 25, 2018, the entire contents of which are incorporated herein by reference.

FIELD

The present disclosure relates to a steering-angle-limiting device of a steer-by-wire (SBW) system, which restricts turning of the steering wheel when the tire cannot be turned.

BACKGROUND

The statements in this section merely provide background information related to the present disclosure and may not constitute prior art.

A steer-by-wire (SBW) system is a steering system having no mechanical connection between a steering wheel and the driving wheels of a vehicle. A rotation signal of the steering wheel is input to an electronic control unit (ECU), and a steering assist motor connected to the driving wheels of the vehicle is operated based on the input rotation signal, whereby the vehicle is steered.

The SBW system has advantages in that freedom of layout is increased based on the structure of the steering system, fuel economy is improved, and disturbance reversely input from the driving wheels of the vehicle is removed, since the SBW system does not have a structure for the mechanical connection between the steering wheel and the driving wheels, unlike a conventional steering system.

However, we have discovered that the SBW system has a disadvantage in that necessary steering information cannot be sufficiently fed back to a driver due to the absence of a mechanical connection structure.

That is, in the conventional steering system, when the turning of the tires is restricted, the turning of the steering wheel is also restricted owing to a mechanical connection structure using, for example, a universal joint. In the SBW system, however, we have discovered that a mechanism for limiting the rotation angle of the steering wheel is desired because the SBW system does not have a structure for the mechanical connection between the steering wheel and the tire-steering system.

For example, in the SBW system, the steering wheel may continue to be rotated even when the steering of the tires is impeded by an external factor, for example, even when one of the tires collides with a curbstone or a paving block and thus cannot be turned any further, and this situation needs to be recognized by the driver. However, in the state in which the tires cannot be turned, if a rotation signal of the steering wheel is continuously input and the driver does not recognize this situation, problems such as overloading of a motor may occur.

Therefore, in order to limit the steering angle, there has been developed a device to hold a column shaft using a solenoid valve, a magnetorheological (MR) damper and a brake. However, we have discovered that because the rotation of the column shaft in both directions is restricted, the steering wheel may be locked when the direction of steering is suddenly reversed.

There has also been developed another steering-angle-limiting device, which adjusts the rotation angle of a column shaft using a planetary gear and a motor and restricts the rotation of the column shaft using a stopper. However, we have discovered that this device has a complicated structure and cannot realize a function of restricting the rotation of the column shaft in both directions when the engine is turned off.

In particular, in the device configured to restrict the rotation of the column shaft using a stopper, when the stopper is damaged or malfunctions while restricting the rotation of the column shaft during traveling of the vehicle, it may become impossible to turn the steering wheel, which may lead to a serious accident.

The information disclosed in this Background of the Present disclosure section is only for enhancement of understanding of the general background of the present disclosure and should not be taken as an acknowledgement or any form of suggestion that this information forms the prior art already known to a person skilled in the art.

SUMMARY

The present disclosure provides a steering-angle-limiting device of a steer-by-wire system, which selectively restricts turning of the steering wheel in a forward direction or in a reverse direction and which permits turning of the steering wheel in order to inhibit or prevent locking of the steering wheel when the steering-angle-limiting device operates abnormally.

In one form of the present disclosure, a steering-angle-limiting device of a steer-by-wire system may include: a stopping gear configured to rotate together with a steering shaft, a cam configured to rotate eccentrically by receiving rotational force from an actuator, a stopper configured to be rotated while being interlocked with the cam, the stopper selectively restricting rotation of the stopping gear in a forward direction and in a reverse direction by being selectively caught in gear teeth of the stopping gear, a controller configured to determine whether the stopper operates abnormally by comparing the current rotation position of the stopper with a target rotation position, and a fail-safe unit configured to move the stopper to a position apart from the gear teeth of the stopping gear by applying moving force to the stopper in the axial direction of the stopper when the controller determines that the stopper operates abnormally.

The fail-safe unit may include a rotating shaft axially coupled to an end portion of the stopper so as to be movable together with the stopper in the axial direction thereof, a solenoid valve configured to be brought into contact with or separated from the rotating shaft and to restrict or permit movement of the rotating shaft, and a moving spring configured to provide elastic force in the axial direction in which the rotating shaft moves.

The rotating shaft may be inserted at an intermediate portion thereof through the stopper so as to be rotatable relative to the stopper. A flange block may be formed at a first end of the rotating shaft. The flange block may have a cross-sectional area greater than a cross-sectional area of the rotating shaft, and may have a locking recess formed in an intermediate portion thereof. The solenoid valve may include a rod configured to be inserted into or separated from the locking recess.

A guide hole may be formed in a portion of a housing that faces the opposite end of the rotating shaft in order to guide movement of the rotating shaft. A spacer may be provided between the guide hole and the rotating shaft. A support spring may be provided in the housing in order to apply elastic force to the rotating shaft in a direction opposite the direction in which the moving spring applies elastic force to the rotating shaft. The support spring may be configured to have a spring constant lower than a spring constant of the moving spring.

The steering-angle-limiting device may further include a contact sensor configured to sense a rotation position of the stopper. The stopper may come into contact with the contact sensor when the stopper is caught in the gear teeth of the stopping gear. Upon determining that the target rotation position of the stopper and the current rotation position of the stopper sensed by the contact sensor are different from each other, the controller may determine that the stopper operates abnormally and may control the operation of the solenoid valve.

The steering-angle-limiting device may further include an angle sensor configured to detect a rotation angle of the actuator. Upon determining that a command value applied to operate the actuator and a measured value of the actuator detected by the angle sensor are different from each other, the controller may determine that the stopper operates abnormally and may control the operation of the solenoid valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
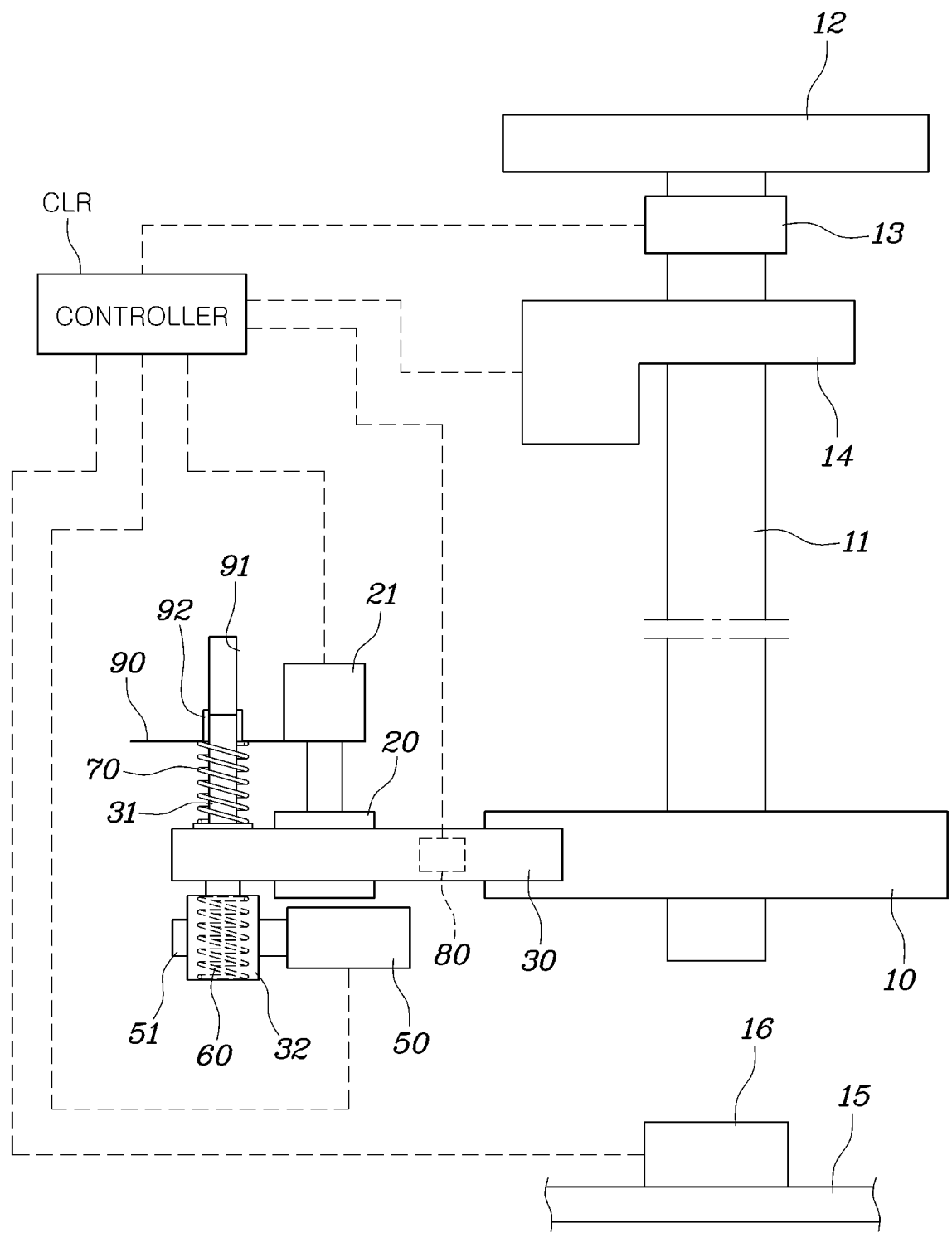
FIG. 1 is a view showing the configuration of a steer-by-wire (SBW) system in which a steering-angle-limiting device in one form of the present disclosure is mounted.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A steering-angle-limiting device of a steer-by-wire (SBW) system according to one form of the present disclosure includes a stopping gear 10, a cam 20, a stopper 30, a controller CLR, and a fail-safe unit.

Referring to FIG. 1, the stopping gear 10 is configured to be rotated together with a steering shaft 11. For example, the steering shaft 11 is fixedly inserted through the stopping gear 10 so that the stopping gear 10 is interlocked with and rotated together with the steering shaft 11.

The steering shaft 11 may be a column shaft configured to rotate together with a steering wheel 12.

The cam 20 is configured to rotate eccentrically by receiving rotational force from an actuator 21. The cam 20 may be disposed beside the stopping gear 10.

The stopper 30 is configured to be rotated in a manner in which it is interlocked with the cam 20. As the cam 20 rotates, the stopper 30 may be rotated and selectively caught in the gear teeth of the stopping gear 10, thereby selectively restricting the rotation of the stopping gear 10 in the forward and reverse directions.

The stopper 30 is formed so as to be elongated in the longitudinal direction. The stopper 30 is provided at one end thereof with a rotating shaft 31. The cam 20 is in contact with the intermediate portion of the stopper 30. Therefore, as the cam 20 rotates, the stopper 30 pivots about the rotating shaft 31 so that the opposite end thereof moves close to or away from the stopping gear 10, to thereby selectively restrict the rotation of the stopping gear 10.

Figure 2:
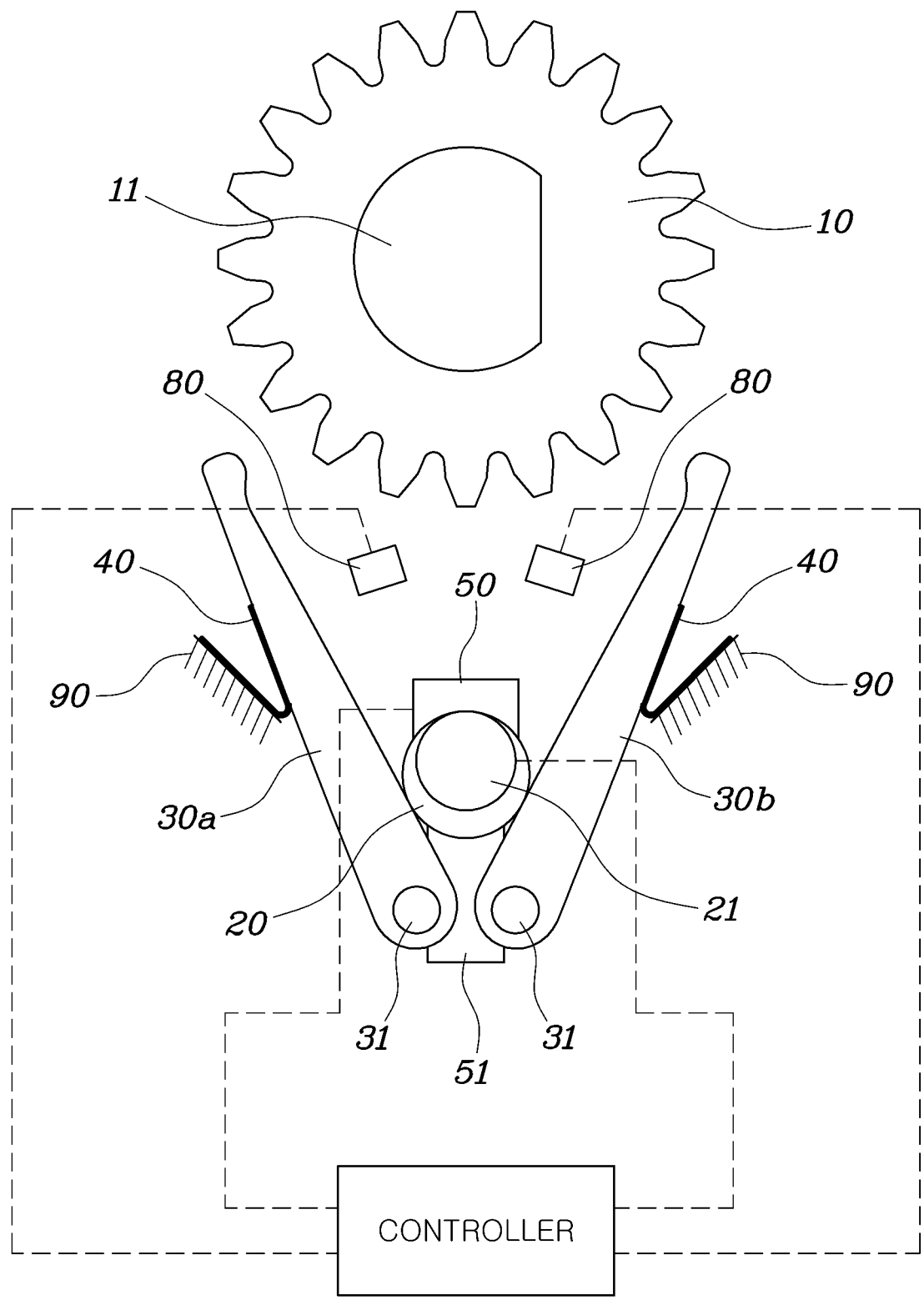
FIG. 2 is a view showing the configuration of the steering-angle-limiting device according to one form of the present disclosure.

With reference to FIG. 2, the configuration of the stopper 30 will be described in more detail. The stopper 30 includes a first stopper 30a, which is disposed at one side of the cam 20, and a second stopper 30b, which is disposed at the opposite side of the cam 20.

The rotating shaft 31 of the first stopper 30a and the rotating shaft 31 of the second stopper 30b are located at positions opposite to the stopping gear 10 with respect to the cam 20. The opposite end of the first stopper 30a is located at one side of the stopping gear 10, and the opposite end of the second stopper 30b is located at the opposite side of the stopping gear 10.

The rotating shaft 31 of the first stopper 30a and the rotating shaft 31 of the second stopper 30b may be provided separately from each other, and may be installed so as to be oriented in the same direction as the axis about which the stopping gear 10 rotates and the axis about which the cam 20 rotates.

Figure 3:
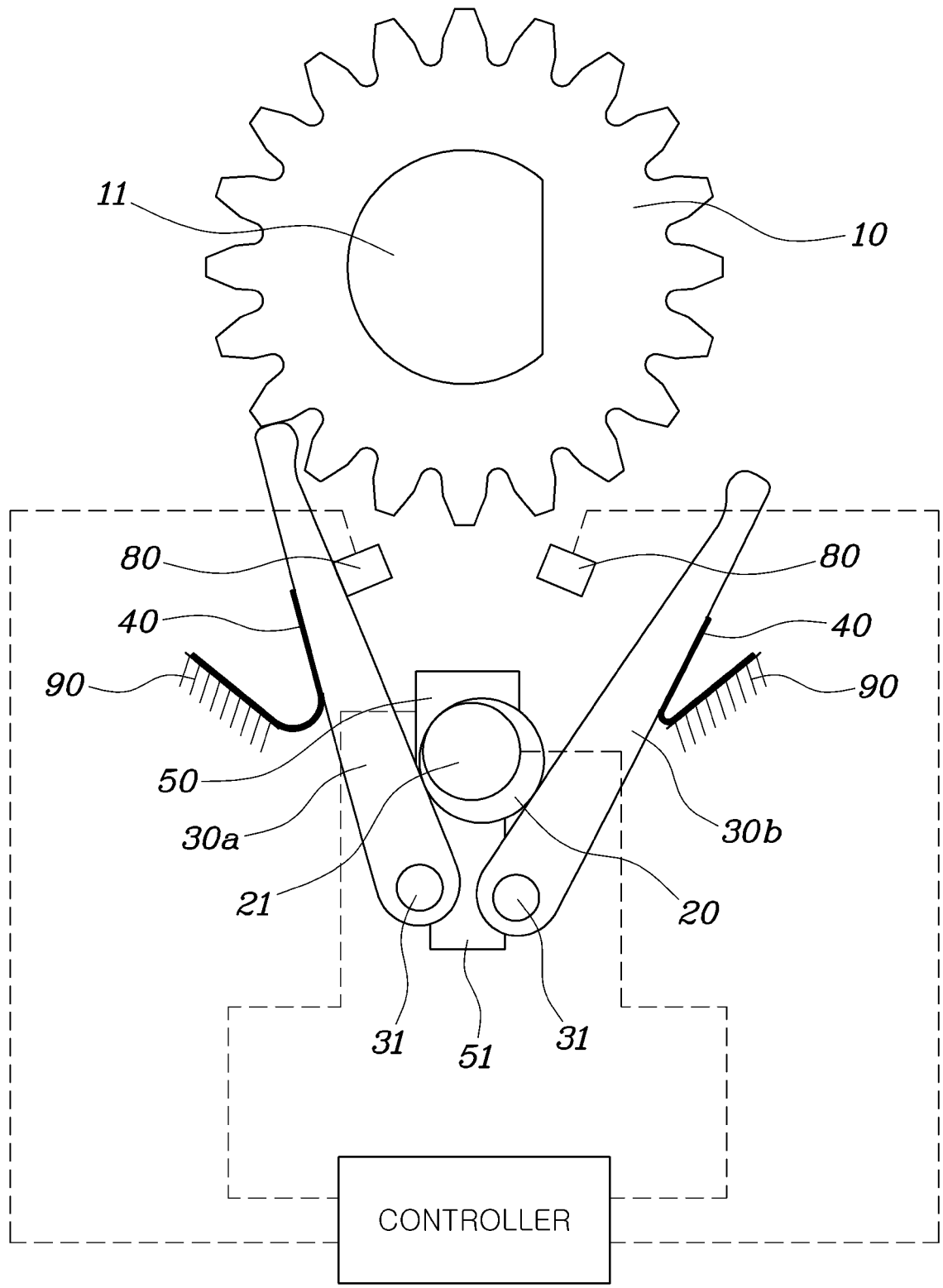
FIG. 3 is a view showing the operational state of the present disclosure in which rotation of a steering shaft in the reverse direction is restricted.

As shown in FIG. 3, when the cam 20 rotates eccentrically to the right, the opposite end of the first stopper 30a, which is located at the left side of the stopping gear 10, is caught in the gear teeth of the stopping gear 10, whereby the rotation of the stopping gear 10 in the reverse direction (counterclockwise direction) is restricted, and consequently the turning of the steering wheel 12 in the reverse direction is restricted. However, in this state, rotation of the stopping gear 10 in the forward direction (clockwise direction) is permitted. Therefore, even when the driver turns the steering wheel 12 suddenly in the forward direction, the steering wheel 12 is capable of rotating in the forward direction.

Figure 4:
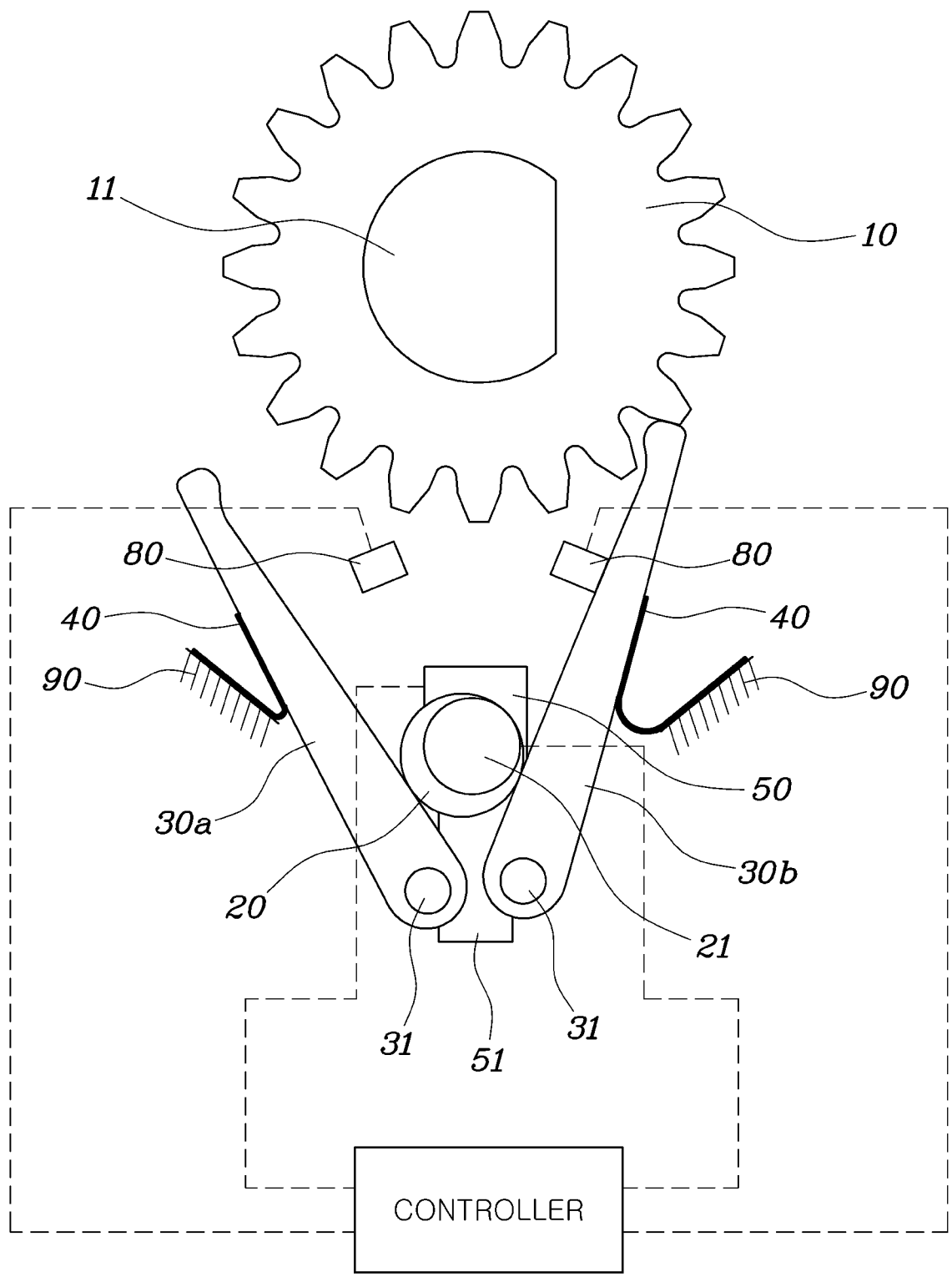
FIG. 4 is a view showing the operational state of the present disclosure in which the rotation of the steering shaft in the forward direction is restricted.

In the same manner, as shown in FIG. 4, when the cam 20 rotates eccentrically to the left, the opposite end of the second stopper 30b, which is located at the right side of the stopping gear 10, is caught in the gear teeth of the stopping gear 10, whereby the rotation of the stopping gear 10 in the forward direction (clockwise direction) is restricted, and consequently the turning of the steering wheel 12 in the forward direction is restricted. However, in this state, the rotation of the stopping gear 10 in the reverse direction (counterclockwise direction) is permitted. Therefore, even when the driver turns the steering wheel 12 suddenly in the reverse direction, the steering wheel 12 is capable of turning in the reverse direction.

Therefore, according to exemplary forms of the present disclosure, it is possible to selectively restrict the rotation of the steering shaft 11 in the forward and reverse directions using a plurality of stoppers 30a and 30b, which are disposed beside the stopping gear 10. Particularly, even when the rotation of the steering shaft 11 in a specific direction is restricted, rotation in the opposite direction is permitted. Accordingly, even when the direction of steering is suddenly reversed by the driver, the steering wheel 12 is capable of turning without being locked.

The controller CLR serves to determine whether the stopper 30 operates abnormally by comparing the current rotation position of the stopper 30 with a target rotation position.

The fail-safe unit serves to apply moving force to the stopper 30 in the axial direction of the rotating shaft 31 of the stopper 30 when the controller CLR determines that the stopper 30 operates abnormally, to thereby move the stopper 30 to a position where the stopper 30 is not caught in the gear teeth of the stopping gear 10.

If the stopper 30 operates abnormally and thus remains caught in the gear teeth of the stopping gear 10, the steering wheel 12 cannot be turned during traveling of the vehicle, leading to a dangerous situation.

Figure 7:
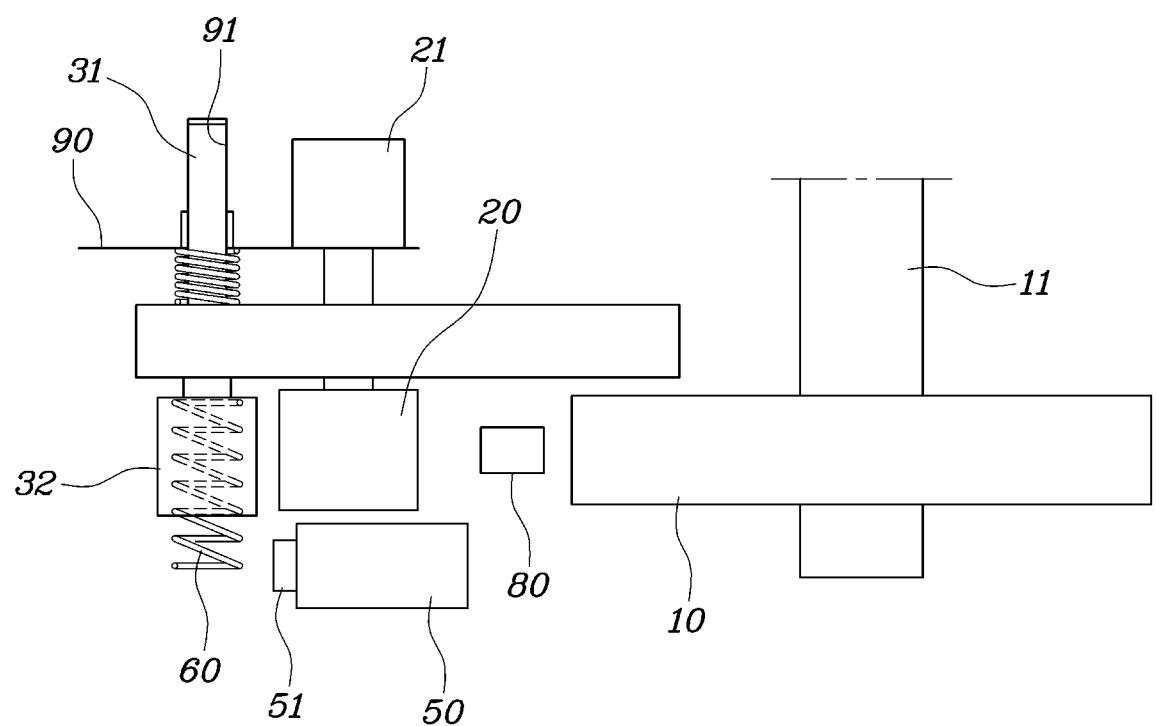
FIG. 7 is a view showing the operational state of the present disclosure in which a stopper is moved when the stopper operates abnormally.

Therefore, when it is determined that the stopper 30 operates abnormally, as shown in FIG. 7, the stopper 30 is moved to a position apart from an end of the radius of rotation of the stopping gear 10, thereby enabling turning of the steering wheel 12 and consequently inhibiting or preventing accidents attributable to locking of the steering wheel 12.

The one form of present disclosure, as shown in FIG. 2, may further include an operating spring 40 to apply elastic force to the stopper 30 so that the opposite end of the stopper 30 is biased toward the stopping gear 10. The operating spring 40 may be implemented as a plate spring.

For example, the operating spring 40 is disposed between the first stopper 30a and the housing 90 and between the second stopper 30b and the housing 90. As the cam 20 rotates eccentrically, the opposite end of the stopper 30 is pushed to the stopping gear 10 by the tensile force of the operating spring 40, and is then caught in the gear teeth of the stopping gear 10, thereby restricting the rotation of the stopping gear 10 in one specific direction.

In this manner, the stopper 30 is selectively caught in the gear teeth of the stopping gear 10 depending on the rotation position of the cam 20.

For example, as shown in FIG. 2, when the cam 20 is in a first rotation position, at which the most eccentric portion of the cam 20 is directed toward a region between the rotating shaft 31 of the first stopper 30a and the rotating shaft 31 of the second stopper 30b, both the opposite end of the first stopper 30a and the opposite end of the second stopper 30b are spaced apart from the stopping gear 10. Accordingly, rotation of the stopping gear 10 in both the clockwise and counterclockwise directions is permitted, thus permitting turning of the steering wheel 12 to the left and right.

Subsequent to the first rotation position, as shown in FIG. 3, when the cam 20 is in a second rotation position, at which the most eccentric portion of the cam 20 is directed toward the second stopper 30b, only the opposite end of the first stopper 30a is caught in the gear teeth of the stopping gear 10. Accordingly, the rotation of the stopping gear 10 in the clockwise direction is permitted, but the rotation of the stopping gear 10 in the counterclockwise direction is restricted, thus restricting turning of the steering wheel 12 to the left.

Figure 5:
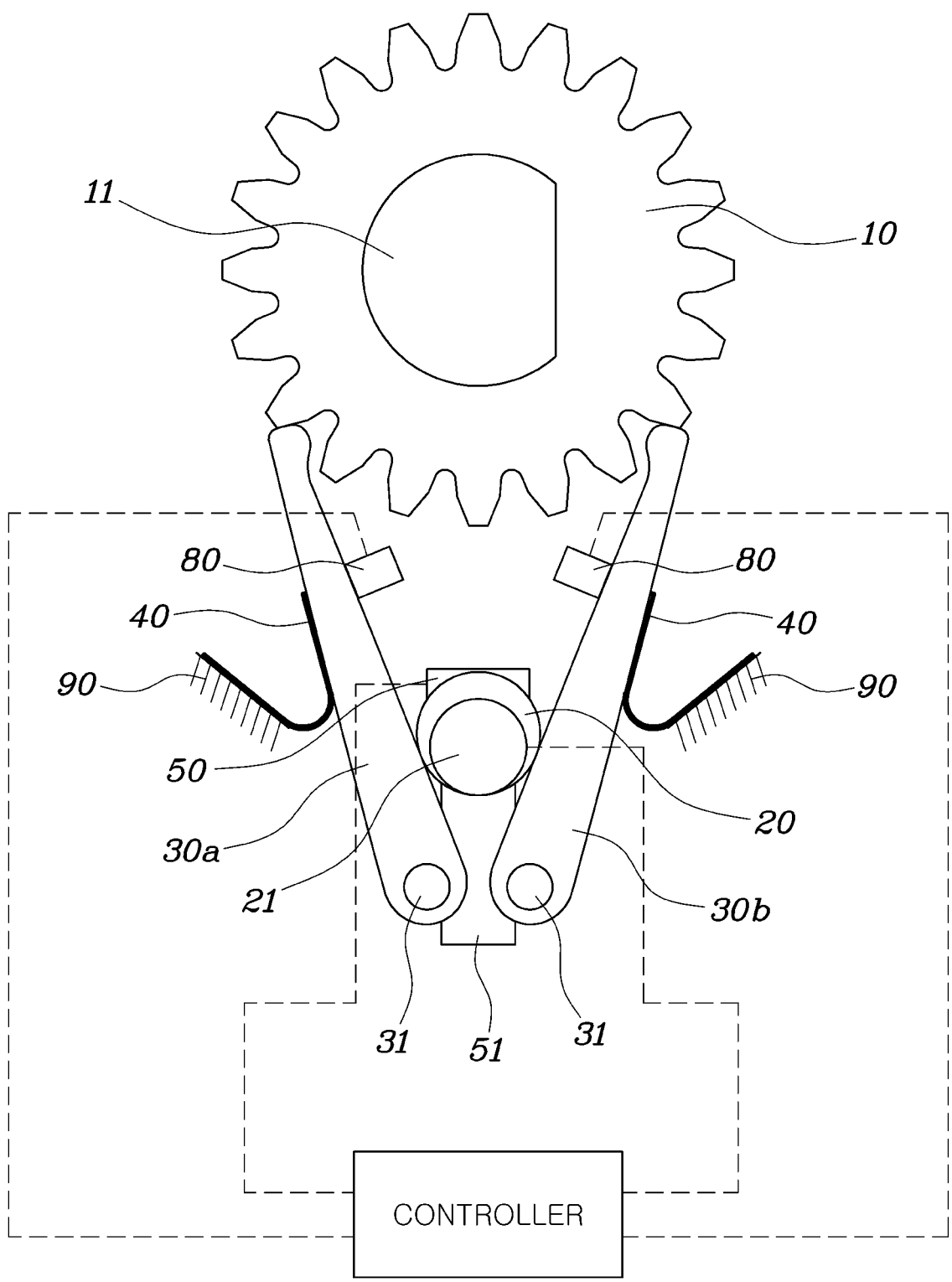
FIG. 5 is a view showing the operational state of the present disclosure in which the rotation of the steering shaft is restricted in both the forward and reverse directions.

Subsequent to the second rotation position, as shown in FIG. 5, when the cam 20 is in a third rotation position, at which the most eccentric portion of the cam 20 is directed toward the stopping gear 10, both the opposite end of the first stopper 30a and the opposite end of the second stopper 30b are caught in the gear teeth of the stopping gear 10. Accordingly, the rotation of the stopping gear 10 in both the clockwise and counterclockwise directions is restricted, thus restricting turning of the steering wheel 12 to the left and right.

Subsequent to the third rotation position and prior to the first rotation position, as shown in FIG. 4, when the cam 20 is in a fourth rotation position, at which the most eccentric portion of the cam 20 is directed toward the first stopper 30a, only the opposite end of the second stopper 30b is caught in the gear teeth of the stopping gear 10. Accordingly, the rotation of the stopping gear 10 in the counterclockwise direction is permitted, but the rotation of the stopping gear 10 in the clockwise direction is restricted, thus restricting turning of the steering wheel 12 to the right.

In addition to the controller CLR and the actuator 21, the present disclosure may further include a steering angle sensor 13, a steering reaction force motor 14, and a steering assist motor 16. According to the exemplary forms of the present disclosure, the steering angle is limited by controlling the operation of the actuator 21 and the steering reaction force motor 14 using the controller CLR.

Figure 10:
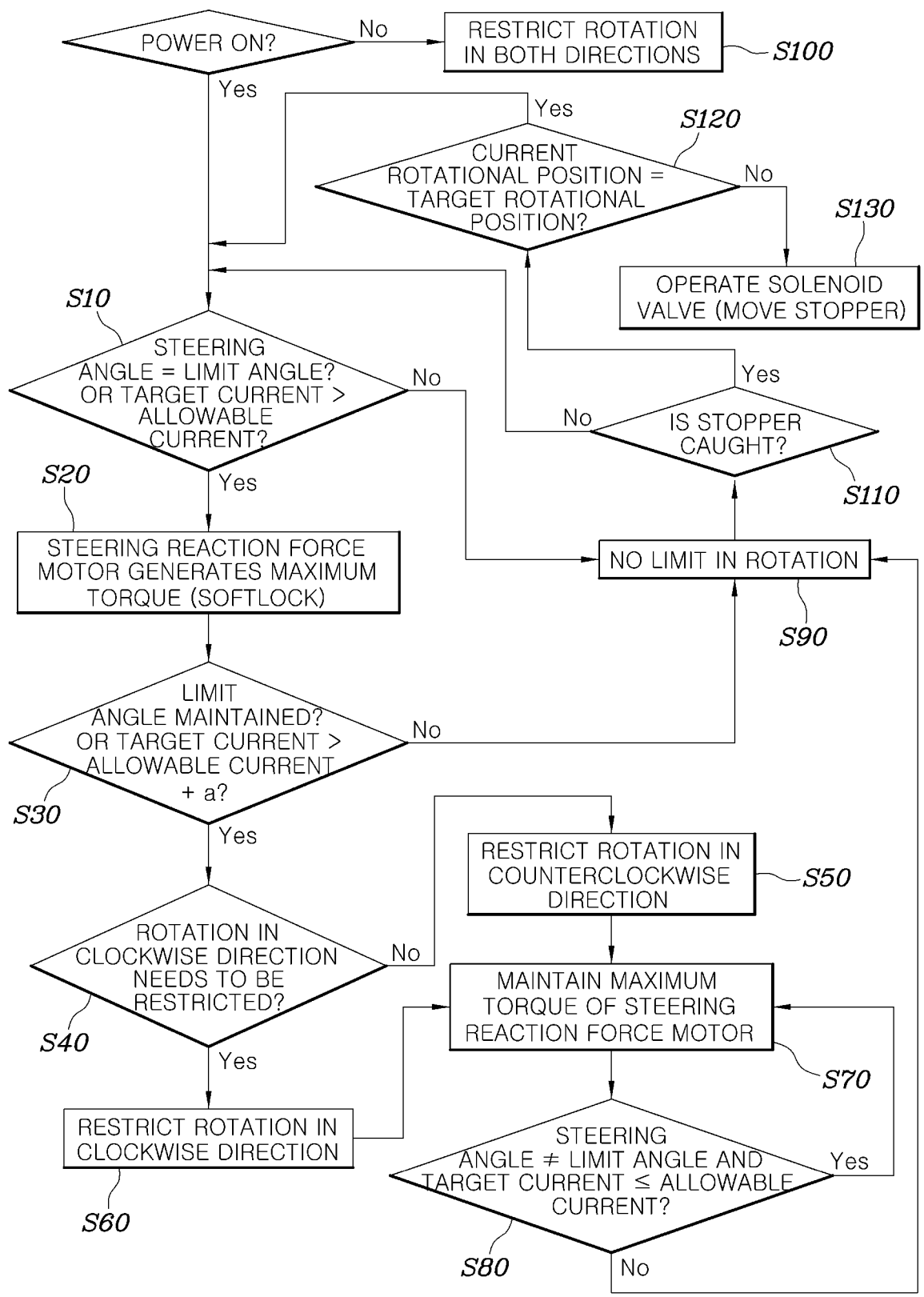
FIG. 10 is a flowchart showing a control process for limiting a steering angle and a fail-safe control process for coping with malfunction of the stopper according to one form of the present disclosure.

Referring to FIGS. 1 and 10, the steering angle sensor 13 is mounted to the steering shaft 11 in order to detect the steering angle of the steering shaft 11, the steering reaction force motor 14 is mounted to the steering shaft 11 in order to provide a steering reaction force to the steering shaft 11, and the steering assist motor 16 is mounted to a rack bar 15 in order to provide a steering force to the rack bar 15.

The controller CLR receives a steering angle detected by the steering angle sensor 13 and a current value of the steering assist motor 16, and controls the operation of the steering reaction motor 14 or the operation of the actuator 21 based on the steering angle and the current value input thereto, thereby selectively restricting the rotation of the steering shaft 11 in the forward and reverse directions.

For example, when the steering angle reaches a limit angle or the target current of the steering assist motor 16 exceeds an allowable current value, the controller CLR performs control such that the steering reaction force motor 14 generates maximum torque in order to restrict the rotation of the steering shaft 11.

That is, upon determining that the steering wheel 12 is fully turned in any one direction and thus the steering angle reaches a limit angle or that the target current of the steering assist motor 16 exceeds an allowable current value due to, for example, a situation in which one of the tires collides with a curbstone and thus cannot be turned any further, the controller CLR performs control so as to generate the maximum current at which the steering reaction force motor 14 may be normally operated, thereby restricting the rotation of the steering shaft 11 (also referred to as "softlock").

In addition, after the steering reaction force motor 14 has generated the maximum torque, when the steering angle is maintained at the limit angle or when the target current of the steering assist motor 16 is greater than the allowable current value by a predetermined value or more, the controller CLR determines the direction in which the rotation of the stopping gear 10 is to be restricted.

The rotation of the stopping gear 10 in the forward direction or in the reverse direction may be restricted using the stopper 30 by controlling the rotation of the cam 20 using the actuator 21.

Specifically, when the direction in which the rotation of the stopping gear 10 is to be restricted is the reverse direction, the rotation of the cam 20 is controlled such that the first stopper 30*a* is caught in the stopping gear 10, but the second stopper 30*b* is released from the stopping gear 10, thereby restricting the rotation of the stopping gear 10 in the reverse direction.

On the other hand, when the direction in which the rotation of the stopping gear 10 is to be restricted is the forward direction, the rotation of the cam 20 is controlled such that the second stopper 30*b* is caught in the stopping gear 10, but the first stopper 30*a* is released from the stopping gear 10, thereby restricting the rotation of the stopping gear 10 in the forward direction.

After the softlock, in which the rotation of the steering shaft 11 is restricted by the steering reaction force motor 14, has been realized, when the steering angle is still maintained at the limit angle or when the target current of the steering assist motor 16 increases further, the turning of the steering wheel 12 to the left or to the right is restricted by restricting the rotation of the stopping gear 10 in the forward direction or in the reverse direction through the pivoting of the first stopper 30*a* or the second stopper 30*b*.

The controller CLR may perform control such that the steering reaction force motor 14 maintains the maximum torque while the rotation of the stopping gear 10 is restricted by the stopper 30.

Figure 6A:
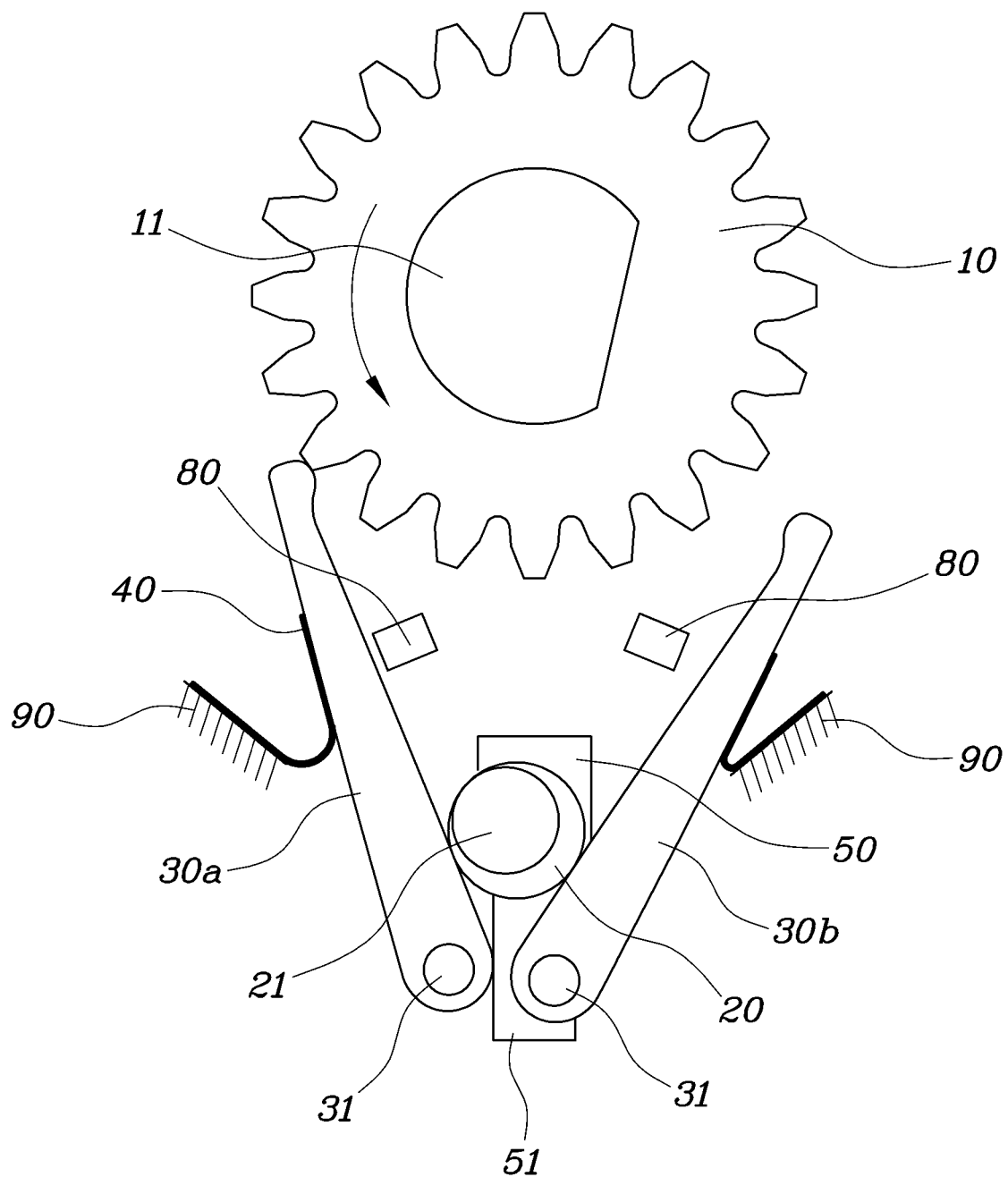
FIGS. 6A to 6D are views showing an impact-reducing operation due to cooperative control of a steering reaction force motor in the process of restricting the rotation of the steering shaft in the reverse direction in one form of the present disclosure.

When the rotation of the stopping gear 10 is restricted by the stopper 30 (also referred to as "hardlock"), as shown in FIG. 6A, the tip of the stopper 30 may not be accurately caught in the gear teeth of the stopping gear 10.

Figure 6B:
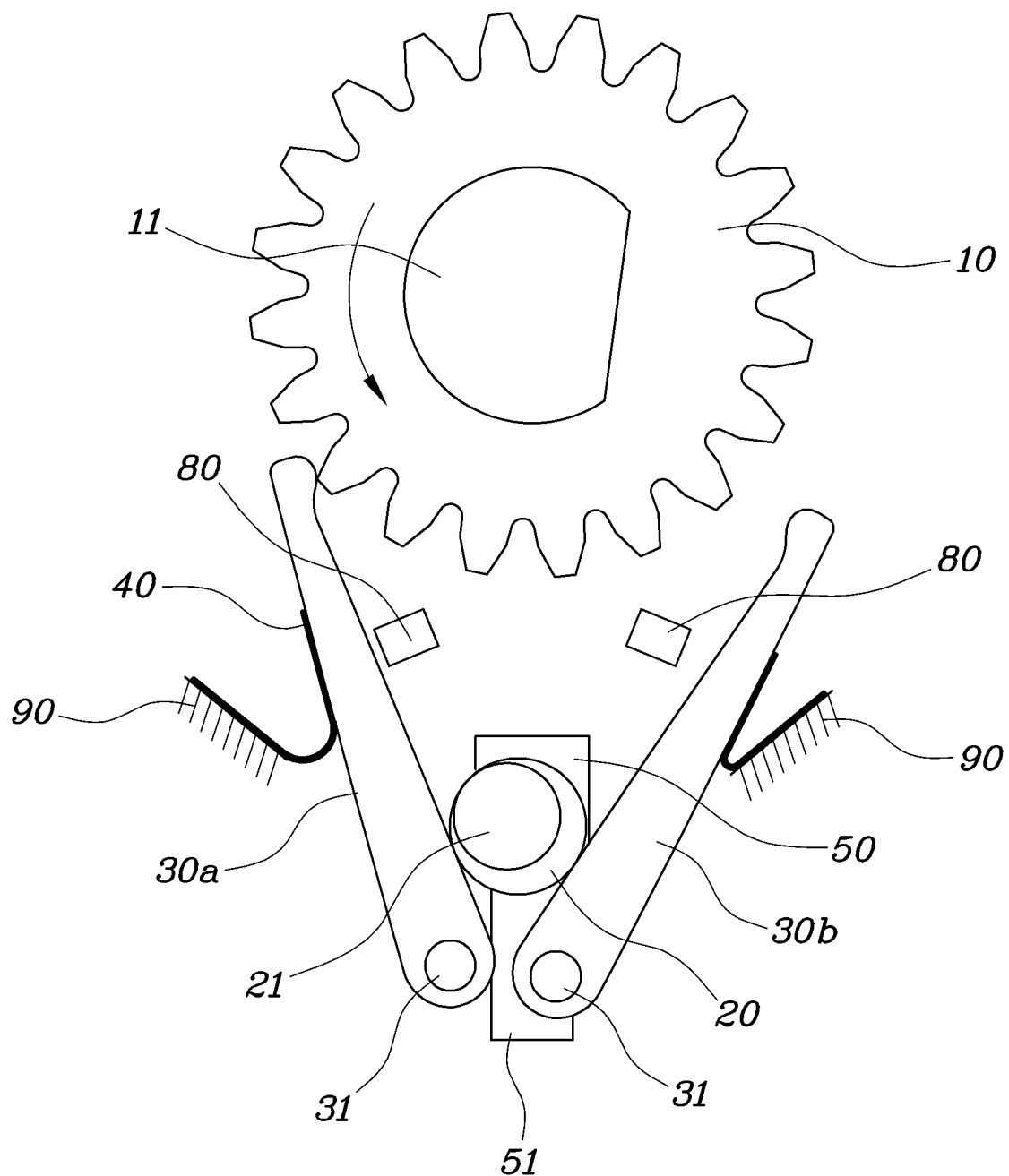
Figure 6C:
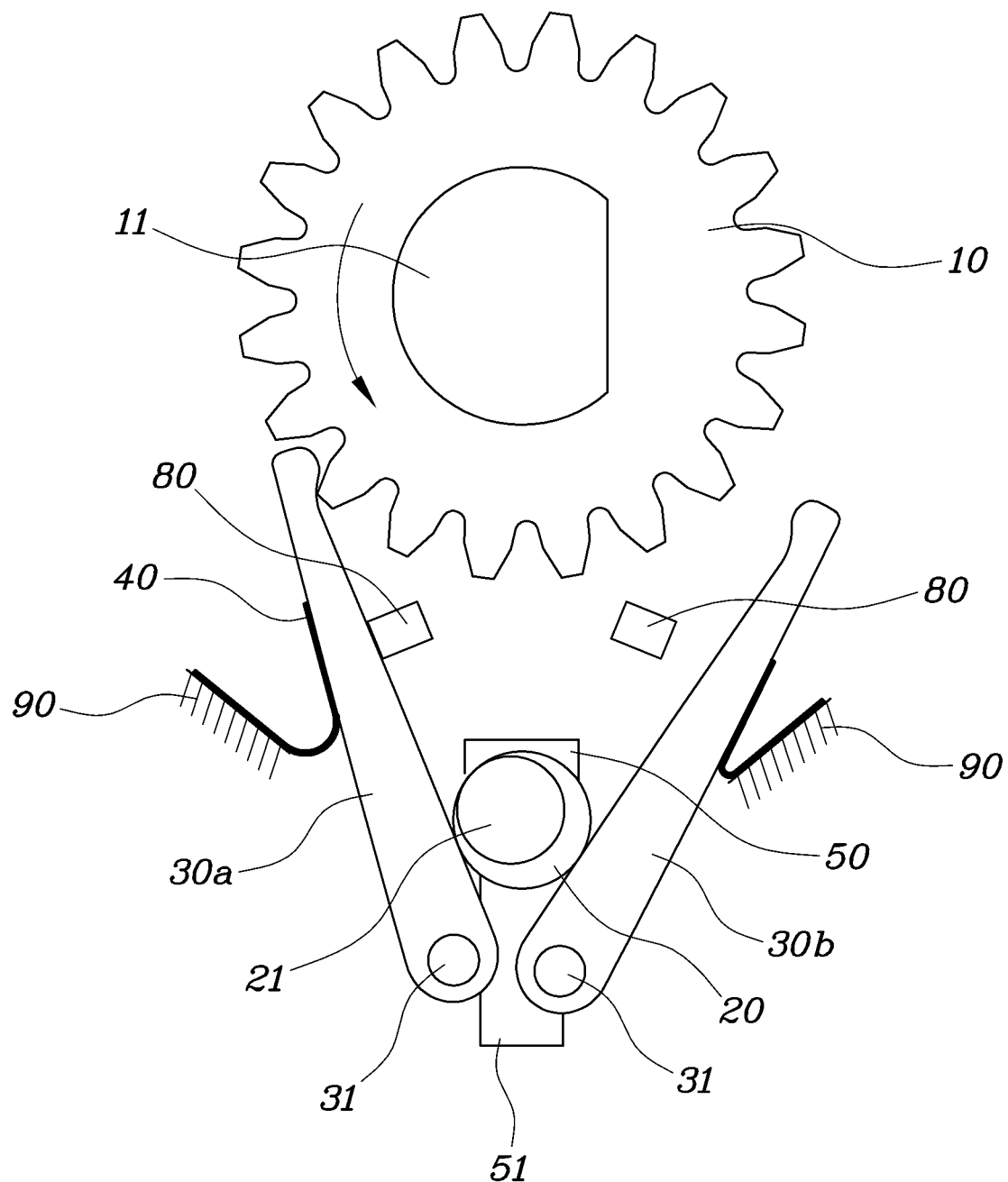
Figure 6D:
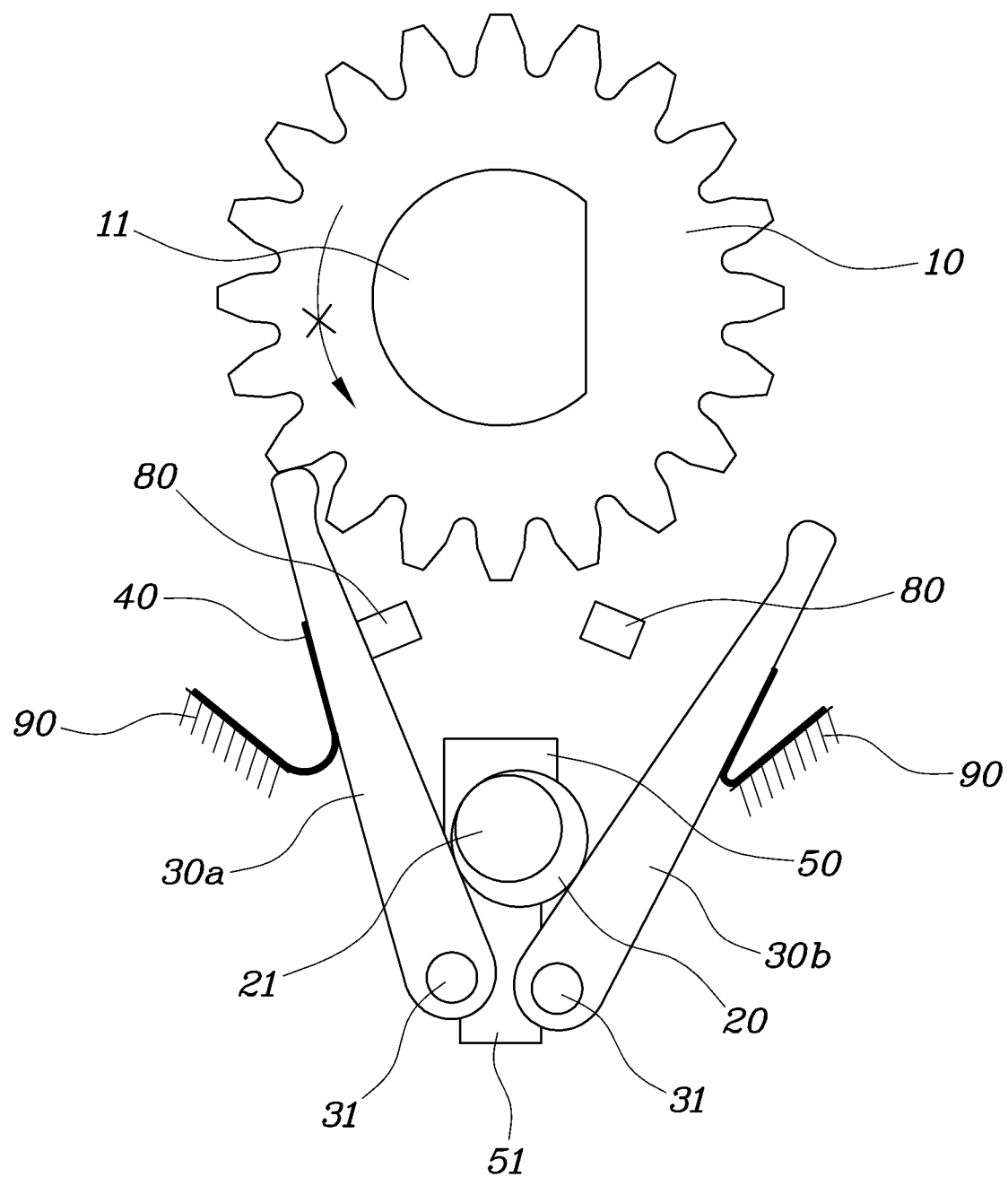

At this time, however, if the softlock, in which the rotation of the steering shaft 11 is restricted by the operation of the steering reaction force motor 14, is being performed, the stopping gear 10 rotates slowly in the order shown in FIGS. 6B to 6D, thus making it possible to reduce the occurrence of impact and noise attributable to collision of the stopper 30 with the gear teeth of the stopping gear 10.

The impact may be further alleviated by increasing the number of gear teeth of the stopping gear 10.

In addition, when the engine is turned off, the controller CLR may control the rotation of the cam 20 such that both the first stopper 30*a* and the second stopper 30*b* are caught in the stopping gear 10 and thus the rotation of the stopping gear 10 in the forward and reverse directions is restricted.

That is, when the engine of the vehicle is turned off, the steering wheel 12 needs to be locked. As shown in FIG. 5, the cam 20 is operated so that both the opposite end of the first stopper 30*a* and the opposite end of the second stopper 30*b* are caught in the stopping gear, with the result that the steering wheel 12 is locked.

As described above, the present disclosure includes the fail-safe unit in order to avoid or prevent the steering wheel 12 from being locked in the event of failure of the stopper 30. The configuration of the fail-safe unit will be described in detail with reference to FIGS. 2 and 8. The fail-safe unit includes a rotating shaft 31, a solenoid valve 50, and a moving spring 60.

The rotating shaft 31 is axially coupled to the end portion of the stopper 30, and is movable together with the stopper 30 in the axial direction thereof.

The solenoid valve 50 is configured to be brought into contact with or separated from the rotating shaft 31 in order to restrict or permit the movement of the rotating shaft 31.

The moving spring 60 is configured to provide elastic force in the axial direction in which the rotating shaft 31 moves. The moving spring 60 may be configured as a coil spring, one end of which is secured to the housing 90 and the opposite end of which is secured to the rotating shaft 31.

Specifically, the rotating shaft 31 is inserted at the intermediate portion thereof through the stopper 30 so as to be rotatable relative to the stopper 30. A flange block 32 is formed at one end of the rotating shaft 31. The flange block 32 has a greater cross-sectional area than the rotating shaft 31. The flange block 32 serves to move the stopper 30 in the axial direction of the rotating shaft 31 by pushing the same.

The flange block 32 has a locking recess 33 formed in the intermediate portion thereof. A rod 51 of the solenoid valve 50 is inserted into or separated from the locking recess 33.

Figure 8:
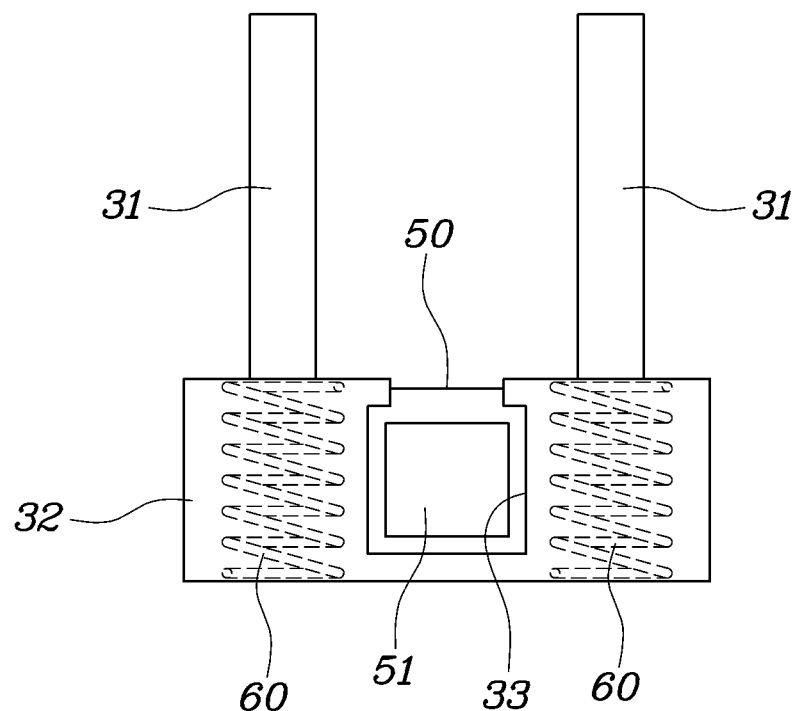
FIG. 8 is a view showing the configuration in which the stopper is restricted by a rod of a solenoid valve.

When the stopper 30 operates normally, as shown in FIG. 8, the rod 51 of the solenoid valve 50 is received in the locking recess 33, and thus the movement of the rotating shaft 31 is restricted. Accordingly, the stopper 30 is capable of operating normally so as to be selectively caught in the gear teeth of the stopping gear 10.

On the other hand, when the stopper 30 operates abnormally, the rod 51 of the solenoid valve 50 moves out of the locking recess 33 in order to permit the movement of the rotating shaft 31.

Subsequently, as shown in FIG. 7, the rotating shaft 31 is pushed in the axial direction thereof by the elastic force of the moving spring 60, and the stopper 30 is therefore moved together with the rotating shaft 31 in the axial direction.

Accordingly, the opposite end of the stopper 30 moves away from the gear teeth of the stopping gear 10, whereby the rotation of the stopping gear 10 is permitted. As a result, the turning of the steering wheel 12, which is connected with the stopping gear 10, becomes possible, thereby inhibiting or preventing accidents attributable to locking of the steering wheel 12.

The portion of the housing 90 that faces the opposite end of the rotating shaft 31 has therein a guide hole 91 for guiding the movement of the rotating shaft 31. A spacer 92 is provided between the guide hole 91 and the rotating shaft 31.

A support spring 70 is provided in order to apply elastic force to the rotating shaft 31 in a direction opposite to the direction in which the moving spring 60 applies elastic force to the rotating shaft 31. The support spring 70 is configured to have a lower spring constant than the moving spring 60.

When the stopper 30 operates normally, the stopper 30 is restricted or prevented from moving in the axial direction by the elastic force of the support spring 70. In addition, the spacer 92 inhibits or prevents shaking of the rotating shaft 31.

Another form of the present disclosure may further include a contact sensor 80 in order to sense the abnormal operation of the stopper 30.

For example, as shown in FIGS. 3 to 5, when the stopper 30 is caught in the gear teeth of the stopping gear 10, the stopper 30 comes into contact with the contact sensor 80. Therefore, the rotation position of the stopper 30 may be sensed by the contact sensor 80, and the controller CLR, which is connected with the contact sensor 80, may receive a sensing signal from the contact sensor 80.

When the calculated target rotation position of the stopper 30 and the current rotation position of the stopper 30 sensed by the contact sensor 80 are different from each other, the controller CLR may determine that the stopper 30 operates abnormally, and may perform control such that the rod 51 of the solenoid valve 50 moves out of the locking recess 33.

As another form of sensing the abnormal operation of the stopper 30, an angle sensor 22 provided at the actuator 21 may be used.

Figure 9:
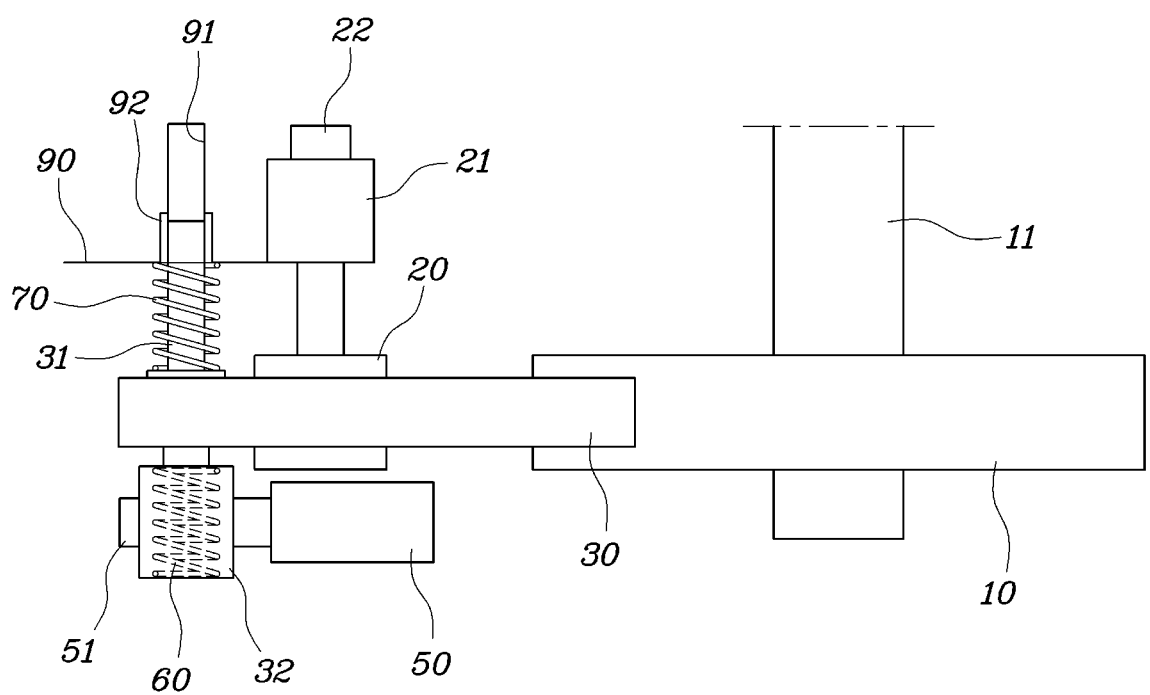
FIG. 9 is a view showing the configuration in which an angle sensor is provided in order to determine abnormal operation of the stopper.

For example, as shown in FIG. 9, the actuator 21 may be a motor and may be provided with an angle sensor 22 for detecting a rotation angle. The rotation angle of the actuator 21 may be detected by the angle sensor 22, and the controller CLR, which is connected with the angle sensor 22, may receive a value measured by the angle sensor 22.

When a command value applied to operate the actuator 21 and a measured value of the actuator 21 detected by the angle sensor 22 are different from each other, the controller CLR may determine that the stopper 30 operates abnormally, and may perform control such that the rod 51 of the solenoid valve 50 moves out of the locking recess 33.

Hereinafter, the process of limiting the steering angle of the steering wheel 12 using the steering-angle-limiting device of a SBW system according to one form of the present disclosure will be described with reference to FIG. 10. When the engine of the vehicle is turned off, as shown in FIG. 5, both the first stopper 30*a* and the second stopper 30*b* are caught in the stopping gear 10, and the rotation of the stopping gear 10 in the forward and reverse directions is therefore restricted.

In this state, when the electric power of the vehicle is turned on, it is determined whether the softlock operation for limiting the steering angle is desired using the steering angle and the target current of the steering assist motor 16 (S10).

When it is determined in S10 that the steering angle has reached a limit angle or that the target current of the steering assist motor 16 exceeds an allowable current value, the controller CLR performs control such that the steering reaction force motor 14 generates a maximum torque in order to restrict the rotation of the steering shaft 11 (S20).

On the other hand, when it is determined in S10 that the steering angle has not reached the limit angle and the target current is equal to or less than the allowable current value, the controller CLR performs control such that rotation of the steering wheel 12 in the forward and reverse directions is permitted (S90).

After S20, it is determined whether the hardlock operation for limiting the steering angle is desired using the steering angle and the target current (S30).

When the steering angle is maintained at the limit angle for a predetermined time period or when the target current is greater than the allowable current value by a predetermined value or more, the controller CLR determines that the hardlock operation for limiting the steering angle is desired, and determines the rotation direction that is to be restricted for the hardlock operation (S40).

When it is determined in S40 that the rotation of the stopping gear 10 in the counterclockwise direction needs to be restricted, as shown in FIG. 3, the cam 20 is rotated eccentrically such that the first stopper 30*a* is caught in the gear teeth of the stopping gear 10, thereby restricting the rotation of the steering wheel 12 in the counterclockwise direction (S50).

When it is determined in S40 that the rotation of the stopping gear 10 in the clockwise direction needs to be restricted, as shown in FIG. 4, the cam 20 is rotated eccentrically such that the second stopper 30*b* is caught in the gear teeth of the stopping gear 10, thereby restricting the rotation of the steering wheel 12 in the clockwise direction (S60).

In the processes of restricting the rotation of the stopping gear 10 (S50 and S60), the torque of the steering reaction force motor 14 is maintained at the maximum torque, thereby reducing the occurrence of impact and noise attributable to collision of the stopper 30 with the gear teeth of the stopping gear 10 (S70).

Subsequently, when the steering angle is reduced from the limit angle and when the target current drops below the allowable current value (S80), as shown in FIG. 2, the cam 20 is rotated eccentrically such that both the first stopper 30*a* and the second stopper 30*b* move away from the gear teeth of the stopping gear 10, thereby permitting the rotation of the steering wheel 12 in the clockwise and counterclockwise directions (S90).

After S90, it may be determined whether both the first stopper 30*a* and the second stopper 30*b* operate normally.

In the case in which the contact sensor 80 is provided, when the first stopper 30*a* or the second stopper 30*b* comes into contact with the contact sensor 80 (S110), it is determined that the first stopper 30*a* or the second stopper 30*b* is caught in the gear teeth of the stopping gear 10.

Subsequently, the controller CLR calculates the target position of the first stopper 30*a* or the second stopper 30*b*. It is determined whether the target position of the first stopper 30*a* or the second stopper 30*b*, which is calculated by the controller CLR, coincides with the rotation position at which the first stopper 30*a* or the second stopper 30*b* is caught in the gear teeth of the stopping gear 10 (S120). When it is determined that the target position does not coincide with the rotation position, it is determined that the corresponding stopper 30 operates abnormally and thus remains caught in the gear teeth of the stopping gear 10, and an operation command is applied to the solenoid valve 50 (S130).

Accordingly, the rod 51 of the solenoid valve 50 moves out of the locking recess 33, and the restraint of the rotating shaft 31 is therefore released. The stopper 30 is moved together with the rotating shaft 31 in the axial direction of the rotating shaft 31 by the elastic force of the moving spring 60, and the opposite end of the stopper 30 moves away from the gear teeth of the stopping gear 10. As a result, it becomes possible to turn the steering wheel 12.

As is apparent from the above description, according to one form of the present disclosure, the rotation of the stopping gear 10, which is coupled to the steering shaft 11, is selectively restricted depending on a change in the rotation angle of the cam 20 under the control of the actuator 21, whereby the direction in which the stopping gear 10 rotates is selectively limited. Therefore, in the state in which rotation of the stopping gear 10 in one direction is restricted, even when the driver suddenly turns the steering wheel 12 in the reverse direction, the steering wheel 12 is capable of turning in the reverse direction without being locked.

In addition, even when the engine of the vehicle is turned off, it is possible to realize a locking function of restricting the turning of the steering wheel in the forward and reverse directions without an additional device and without the application of electric power.

In addition, when the stopper 30 operates abnormally and thus remains caught in the gear teeth of the stopping gear 10, the stopper 30 is moved to a position apart from an end of the radius of rotation of the stopping gear 10, thereby enabling turning of the steering wheel 12 and consequently inhibiting or preventing accidents attributable to locking of the steering wheel 12.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A steering-angle-limiting device of a steer-by-wire system, comprising:
    a stopping gear configured to rotate together with a steering shaft;
    a cam configured to rotate eccentrically by receiving rotational force from an actuator;
    a plurality of stoppers including a first stopper and a second stopper, and configured to be rotated while being in direct contact with the cam, wherein the cam is disposed between the first stopper and the second stopper and configured to cause the first and second stoppers to selectively restrict rotation of the stopping gear in a forward direction and in a reverse direction by being selectively caught in gear teeth of the stopping gear;
    a controller configured to determine whether the first and second stoppers operate abnormally by comparing a current rotation position of the first and second stoppers with a target rotation position, wherein the current rotation position is detected by a plurality of contact sensors when contacted with at least one of the first stopper or the second stopper; and
    a fail-safe unit configured to move the first and second stoppers to a position apart from the gear teeth of the stopping gear by applying moving force to the first and second stoppers in an axial direction of the first and second stoppers when the controller determines that at least one stopper of the first and second stoppers operates abnormally,
    wherein the fail-safe unit comprises:
        a first rotating shaft and a second rotating shaft respectively coupled to end portions of the first and second stoppers, the first and second rotating shafts being movable together with the first and second stoppers in an axial direction thereof;
        a solenoid valve configured to be brought into contact with or separated from the first and second rotating shafts and to restrict or permit movement of the first and second rotating shafts; and
        a first moving spring and a second moving spring configured to respectively provide an elastic force in the axial direction in which the first and second rotating shafts move.

2. The steering-angle-limiting device according to claim 1, wherein the first and second rotating shafts are respectively inserted at an intermediate portion thereof through the first and second stoppers so as to be rotatable relative to the first and second stoppers,
    wherein a flange block is formed at a first end of the first and second rotating shafts, and the flange block has a cross-sectional area greater than a cross-sectional area of the first and second rotating shafts and includes a locking recess formed in an intermediate portion thereof, and
    wherein the solenoid valve comprises a rod configured to be inserted into or separated from the locking recess.

3. The steering-angle-limiting device according to claim 2, wherein at least one guide hole is formed in a portion of a housing that faces a second end of the first and second rotating shafts and configured to guide movement of the first and second rotating shafts,
    wherein at least one spacer is provided between the guide hole and at least one of the first rotating shaft or the second rotating shaft, and
    wherein a support spring is provided in the housing and configured to apply an elastic force to at least one of the first rotating shaft or the second rotating shaft in a direction opposite to a direction in which the first and second moving springs apply the elastic force to the first and second rotating shafts, the support spring configured to have a spring constant lower than a spring constant of the first and second moving springs.

4. The steering-angle-limiting device according to claim 1, wherein the plurality of contact sensors are configured to sense the current rotation position of the first and second stoppers when at least one of the first stopper or the second stopper is caught in the gear teeth of the stopping gear,
    wherein, upon determining that the target rotation position of the first and second stoppers and the current rotation position of the first and second stoppers sensed by the contact sensor are different from each other, the controller determines that the first and second stoppers operate abnormally and controls operation of the solenoid valve.

5. The steering-angle-limiting device according to claim 1, further comprising:
    an angle sensor configured to detect a rotation angle of the actuator,
    wherein, upon determining that a command value applied to operate the actuator and a measured value of the actuator detected by the angle sensor are different from each other, the controller determines that the first and second stoppers operate abnormally and controls operation of the solenoid valve.

* * * * *